Feb. 7, 1961 O. P. WARNER 2,970,671
SEPARATOR FOR REMOVING LIQUIDS AND SOLIDS FROM VAPORS
Filed Dec. 17, 1953 4 Sheets-Sheet 1
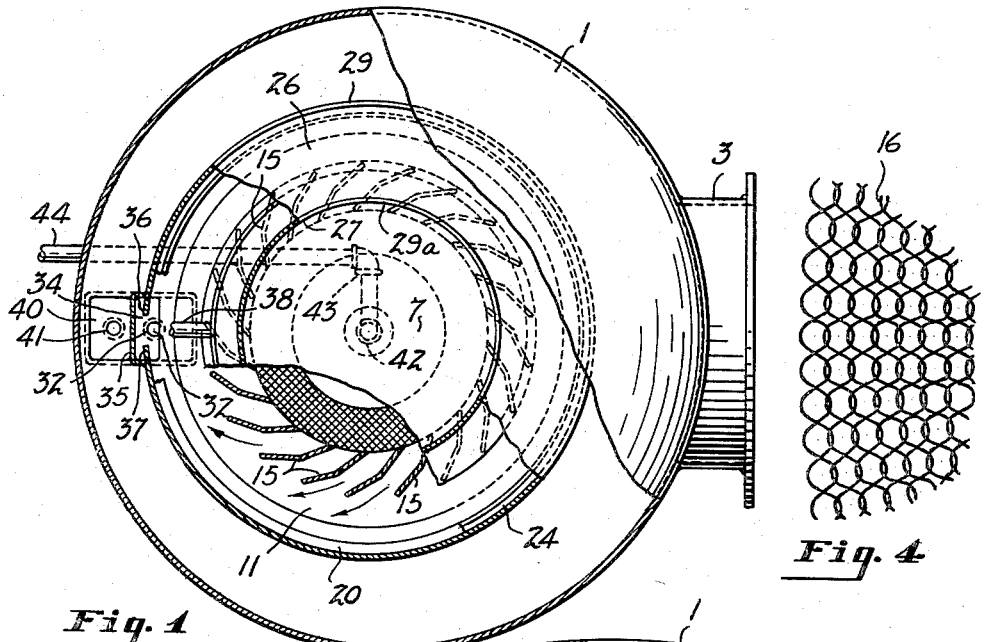
Fig. 1
Fig. 4
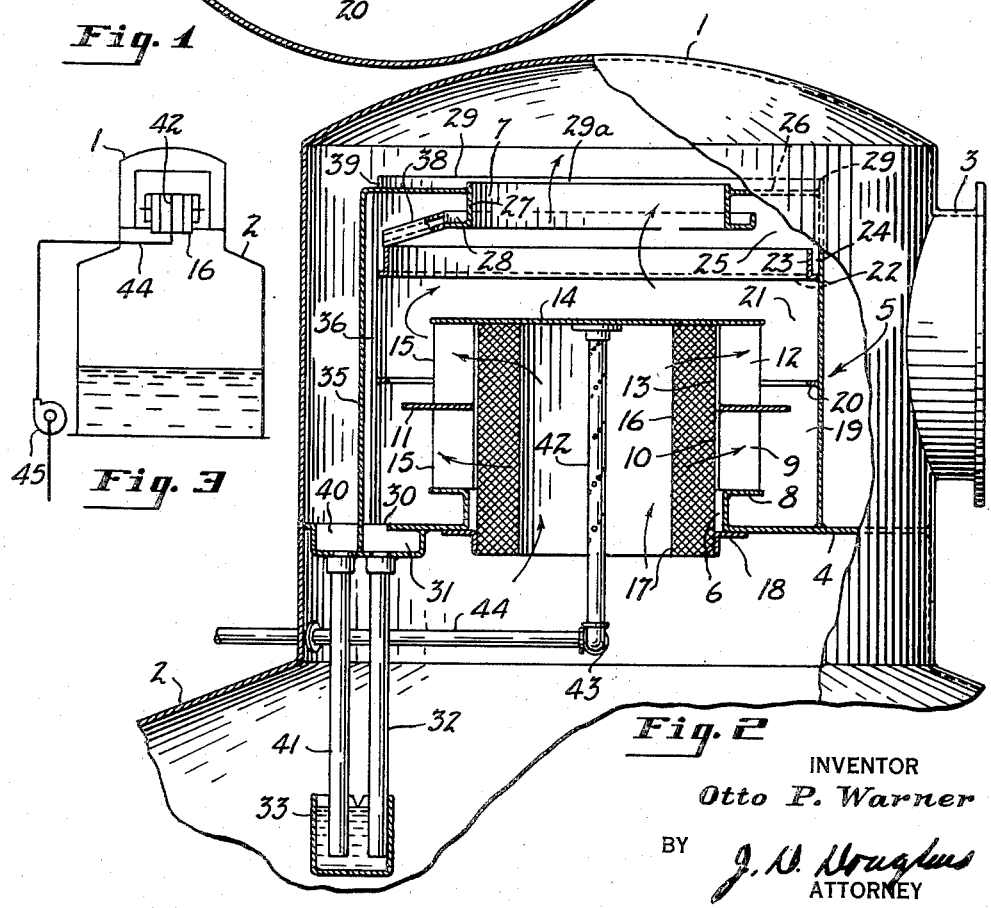
Fig. 3
Fig. 2
INVENTOR
Otto P. Warner
BY
J. D. Douglas
ATTORNEY Feb. 7, 1961            O. P. WARNER            2,970,671

SEPARATOR FOR REMOVING LIQUIDS AND SOLIDS FROM VAPORS

Filed Dec. 17, 1953            4 Sheets-Sheet 2

INVENTOR
*Otto P. Warner*
BY
*J. D. Douglas*
ATTORNEY

INVENTOR
Otto P. Warner
BY
ATTORNEY

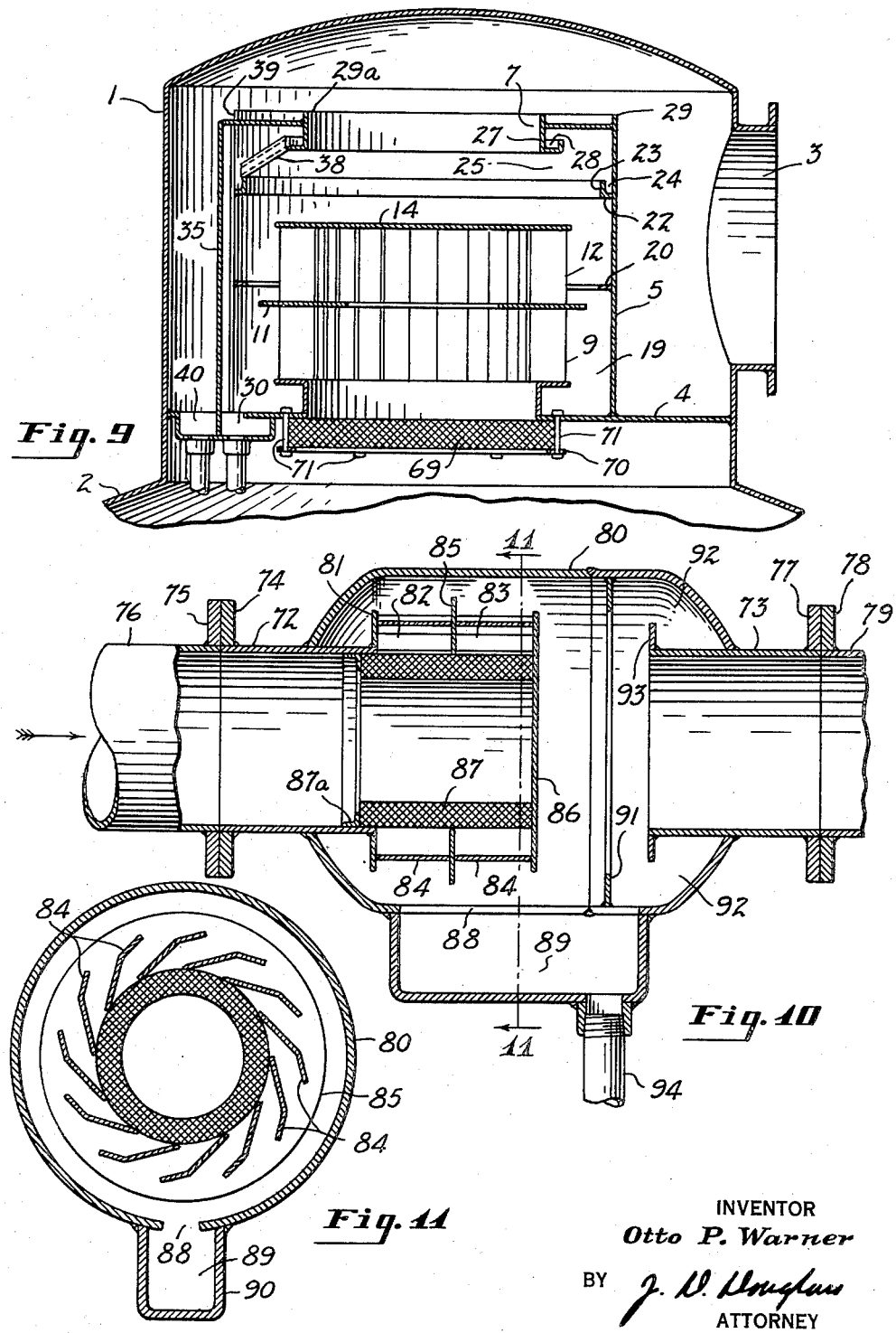

United States Patent Office 2,970,671
Patented Feb. 7, 1961

2,970,671

SEPARATOR FOR REMOVING LIQUIDS AND SOLIDS FROM VAPORS

Otto P. Warner, 13422 Harlon Ave., Lakewood, Ohio

Filed Dec. 17, 1953, Ser. No. 398,715

2 Claims. (Cl. 183—34)

This invention relates to separators for removing liquids and solids from vapors for any desired purpose and constitutes an improvement in the invention disclosed in Patent No. 2,399,842, granted on May 17, 1946. More particularly, it relates to separators for installation in evaporators or stills, or in a line, to remove entrained liquids, solids or solutions or suspension of solids in liquids, from vapors while the vapors are passing from the liquids being vaporized or through a conduit line to an exit opening.

Separators of this type are extensively utilized in various industries, such as in chemical plants, paper mills, distilleries, mining, metal, and oil refineries, water purification plants, and in the manufacture of various products, such as corn products, soap, and the like. In some industries, the separation of the liquid and the solid phases is desirable to produce a vapor phase having improved properties. For instance, it is desirable to separate the liquid and solid phases in water purification plants or in steam boilers in which the vapor constitutes the valuable product while in other cases it is desirable to separate the liquid and solid phase from solutions which are being concentrated to prevent the loss of valuable solid material, such as in the concentration of aqueous solutions of sodium hydroxide or sodium chloride. In evaporators or stills operated at atmospheric or reduced pressure in which a comparatively high rate of evaporation is provided, it is also desirable to provide a separator which will not appreciably affect the pressure of vapors flowing from the liquid being vaporized to the exit opening. This is true because in many cases, the vapors are subsequently condensed to provide a purified product and to recover the heat energy from the vapors, or they may be condensed merely to recover the heat energy, and when this heat energy is utilized for other applications, the loss of temperature because of the loss of pressure might seriously affect the operation of an entire plant.

It is the aim of the present invention to provide an improved separator which effectively removes liquids, solids, and suspensions or solutions of solids, from vapors without appreciably affecting the pressure of the vapor in a still or evaporator, or in a pressure line through which the vapors are being conducted. In its broad aspects, the separator includes as an essential part thereof a filter formed of fine wires arranged in close proximity to each other to form a plurality of baffles. To provide this arrangement, the wires are preferably closely woven or knitted in the form of a wire mesh which is rolled or shaped in any desirable manner to provide a filter having a thickness ranging from approximately 1 to 4 inches and which has a comparatively high free volume for the flow of vapors through the filter. According to the invention, the wire filter is arranged in combination with a plurality of stationary vanes which impart to vapors flowing through the separator a centrifugal or whirling motion. The wire filter may be arranged in such relation to the stationary vanes that a considerable portion of the liquid and solid phases entrained with the vapors are coalesced before the vapors pass between the stationary vanes in which case means may be provided to remove solid material that may be embedded in the wire filter or the wire filter may be so arranged with respect to the stationary vanes that entrained liquids and solids may be coalesced from the vapors after the vapors have passed between the stationary vanes.

In the improved construction, the wire filter may be arranged in or supported by means, such as the same casing or structure which supports the stationary vanes to provide a substantially unitary structure. It may also be positioned in such relation to the stationary vanes that the vapors are flowing at a lower velocity when they pass through the wire filter than when passing between the vanes. The wire filter which is utilized is prepared in a manner to provide a comparatively high free volume for the flow of vapors so that when it is placed in a position to coalesce entrained liquids and solids, it will not appreciably affect the pressure of the vapors flowing between the vanes and when placed in position to coalesce entrained liquids and solids from vapors flowing from the casing, it will not appreciably affect the pressure of the vapors flowing to the exit opening of the evaporator, still, or pressure line.

It is therefore an object of the present invention to provide an improved separator for effectively removing entrained liquids and solids from vapors for any desired purpose without appreciably reducing the pressure and temperature of the vapors.

Another object of the invention is to provide an improved separator in which means are provided to coalesce entrained liquids and solids from the vapor phase while the vapors are moving at a comparatively low velocity and in which additional means are provided to remove entrained liquids and solids by subjecting the vapors to a centrifugal or whirling movement.

A further object of the invention is to provide a separator having a casing for supporting a plurality of spaced vanes arranged to provide a centrifugal or whirling motion to vapors passing through the casing which casing also serves to support a wire filter in such position that vapors flowing from a liquid phase to an outlet or exit opening in an evaporator or still must pass between the stationary vanes and through the wire filter.

A still further object of the invention is to provide an improved separator including a casing having inlet and outlet openings and means arranged within the casing for imparting a centrifugal or whirling motion to vapors passing through the casing in combination with a wire filter associated with but arranged outside of the casing and having a greater surface area than either the inlet or the outlet opening of the casing for coalescing entrained liquids and solids from the vapors.

The invention will be better understood by reference to the acompanying drawings in which:

Fig. 1 is a plan view showing the dome of an evaporator with the improved separator arranged therein, parts being broken away at various levels to show adjacent structure;

Fig. 2 is a cross sectional view of the dome of an evaporator with the improved separator arranged therein, parts of the dome being shown in elevation;

Fig. 3 is a diagrammatic view of an evaporator showing means for forcing liquid against the inner periphery of the separator;

Fig. 4 is an enlarged diagrammatic view of a portion of a wire filter that may be utilized;

Figs. 8 and 9 are cross sectional views similar to that shown in Fig. 7, each showing an additional modification of the separator;

Fig. 10 is a cross sectional view of the improved separator installed in a conduit means; and Fig. 11 is a cross sectional view in a plane passing through the line 11—11 of Fig. 10, looking in the direction of the arrows.

Figure 5:
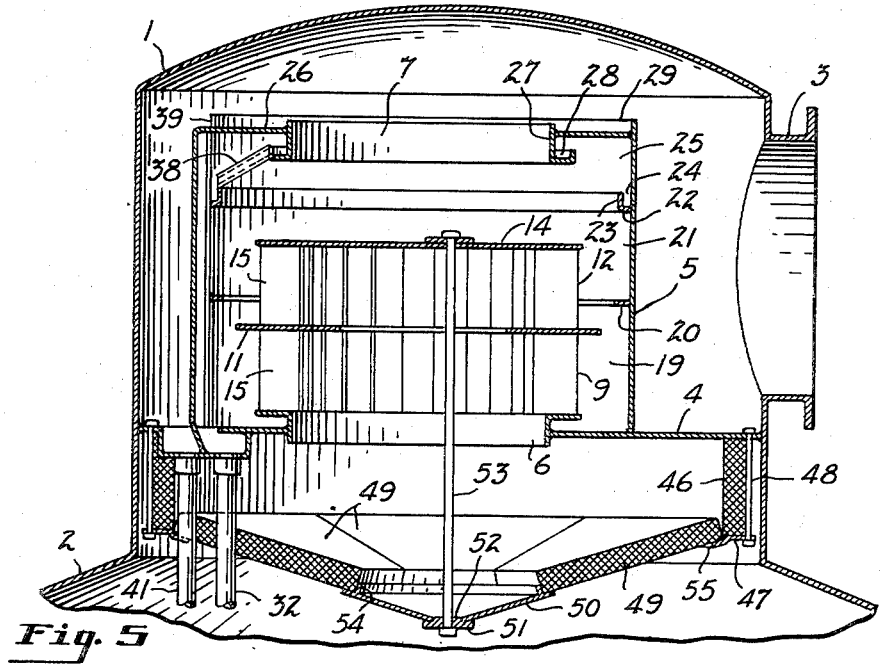
Fig. 5 is a cross sectional view of a modification of the separator installed in the dome of an evaporator which is also shown in section.

Although the improved separator of the present invention may be arranged in a line as shown in Figs. 10 and 11 through which vapors may be passed under pressure or internally of an evaporator or still of any desired type to remove entrained liquids and solids from vapors flowing from the liquid phase to an exit opening, as illustrated in Figs. 1 to 3 of the drawing, it is shown arranged in the dome 1 of the evaporator or still 2 which is provided with a suitable heating means for vaporizing a liquid, the vapors from which pass from the liquid phase to an exit opening 3 extending from the dome.

As illustrated in Fig. 2, the dome is provided with a horizontal wall 4 for intercepting vapors passing from the liquid phase to the exit opening of the evaporator or still and arranged within the dome is a casing 5 which is cylindrical or substantially cylindrical in shape. Casing 5 is provided with an inlet opening 6 and an outlet opening 7 and means are arranged within the casing for supporting a pair of stationary tuyeres for imparting a centrifugal or whirling motion to vapors passing through the separator. For this purpose wall 4 is extended beyond the cylindrical wall of the casing and is bent upwardly concentric with the vertical axis of the casing and is then bent outwardly to form a horizontal flange 8 on which is supported a tuyere 9 of the cylindrical barrel type having a central opening 10 and arranged above tuyere 9 is a partition plate 11 having a central opening of the same size as the opening in the casing which plate 11 supports a second tuyere 12 which is similar in shape to tuyere 9. Tuyere 12 is also provided with a central opening 13 coaxial with and similar to the opening in tuyere 9, and arranged above the tuyere 12 is a baffle plate 14 which intercepts the flow of vapors from the inlet opening so that the vapors passing through the separator must flow through the tuyeres to the outlet opening 7 in the casing. Tuyeres 9 and 12 are similar to each other and both consist of a plurality of vanes 15 peripherally spaced from each other and inclined to a radial plane passing through the axis of the casing as clearly shown in Fig. 1. The vanes 15 in tuyere 9 may be welded or otherwise secured to flange 8 and plate 11 and in a like manner, the vanes in and baffle 14.

According to the present invention, a filter 16 consisting of fine wires arranged in close proximity to each other in the form of baffles is provided which is substantially cylindrical in shape and has a central opening 17. As illustrated in Figs. 1 and 2 of the drawing, the wire filter is arranged within the central openings formed in wall 4, tuyeres 9 and 12, and partition plate 11 with its upper end abutting against baffle plate 14. The wire filter may be supported in place by any suitable means. As illustrated, a circular angle member 18 is provided, one of the annular flanges of which is secured to the wall 4 adjacent opening 6 and the other flange of which engages the outer periphery of the lower portion of the wire filter to which it may be secured by suitable means, such as by providing openings in the downwardly extending flange of the angle member 18 to which the filter may be secured by tie wires. To firmly maintain wire filter 16 in place, its central portion may, if desired, be secured to partition plate 11 in a similar manner.

In preparing the filter illustrated in Figs. 1 to 4, wires which may be round or in the form of a flat ribbon, are preferably woven or knitted together in the form of a mesh and are then rolled into a cylindrical shape to provide a filter which may range in thickness from approximately one to four inches. By the proper selection of wire diameter and the density of the basic wire fabric, a cylindrical filter may be provided having a free volume through which vapors may pass ranging from approximately 88% to 99% although in such filters the free volume for the passage of vapors will usually be from approximately 97% to 98%. The wire which is utilized should be comparatively fine. It may, for instance, have a diameter or width of approximately .01 of an inch. In such filters, the vapors do not pass directly through the filter but the wires are arranged in sufficiently close relation to each other to provide a multiplicity of baffles on which the entrained droplets of liquid impinge and as the liquid accumulates, drops are formed which fall downwardly and either drain off or are picked up by the rising vapors.

Figure 7:
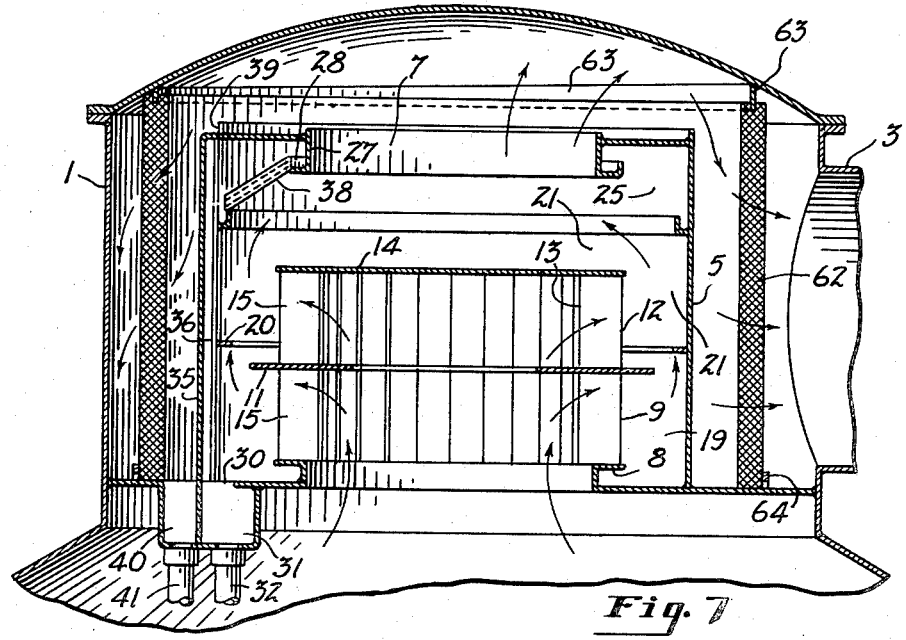
Fig. 7 is a cross sectional view of another modification of the separator installed in the dome of an evaporator which is also shown in cross section.
Figure 8:
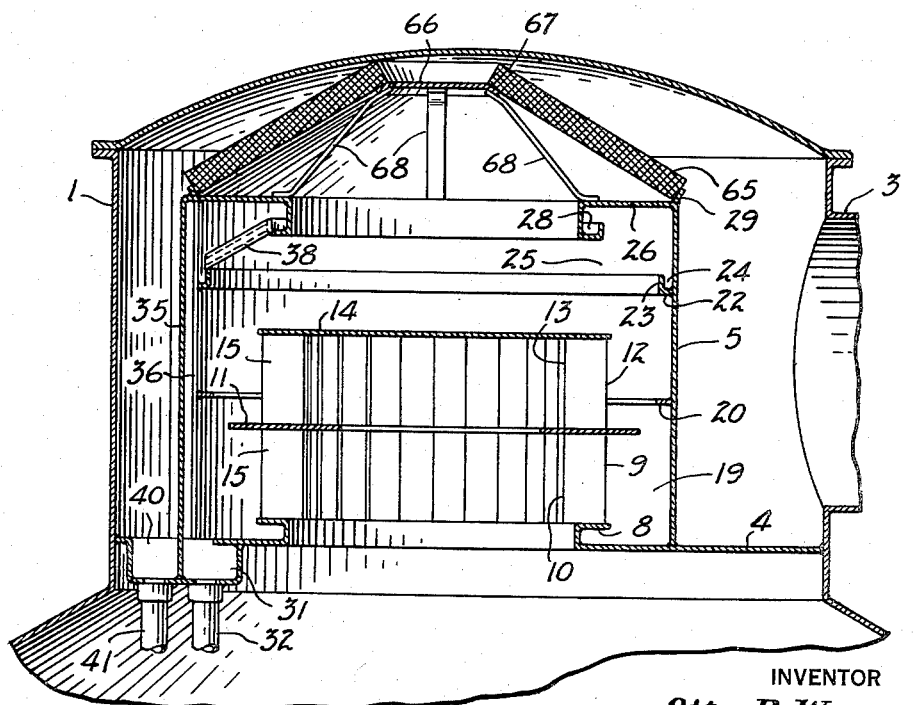

The filter may be so arranged with respect to the stationary tuyere mechanism that the vapors are not travelling at too high a velocity when they pass through the wire filter and while the wire filter may be placed in a position to coalesce entrained liquids and solids from the vapors after they have passed through the stationary tuyeres as illustrated in Figs. 7 and 8, in Figs. 1 to 4 the wire filter is placed in a position to coalesce entrained liquids and solids from the vapors before they pass through the stationary tuyeres.

As illustrated in Figs. 1 to 3, the lower edge of filter 16 is exposed to vapors and the vapors flowing from the liquid phase to the outlet opening of the separator pass through the lower portion of filter 16 and through the annular opening in the filter to the stationary tuyeres 9 and 12 and the liquid entrained with the vapors impinges on the wire baffles of the filter and forms droplets which coalesce when they reach sufficient size and are carried outwardly by the vapors through the openings between the vanes and are forced by the whirling or centrifugal imparting action of the vanes against the inner wall of the casing. Solids entrained in the vapors will be partly retained by the filter although some of the solid particles, if small in size, and particularly when in solution or in suspension in the liquid, will also flow through the openings between the vanes and will be thrown by the vanes with a whirling motion against the inner wall of the casing. In view of the comparatively high free volume of the wire filter to the flow of vapors, the pressure of the vapors flowing from the liquid phase to the tuyeres 9 and 12 will not be appreciably lowered by the wire filter.

The tuyeres 9 and 12 consist of a plurality of vanes which direct the vapors outwardly in a tangential direction against the wall 5 of the casing, imparting a whirling or centrifugal motion to the vapors. The whirling vapors also advance vertically in the casing between the inlet and outlet openings in the casing because of the pressure differential, and liquids and solids which are entrained in the vapors are deposited upon the inner surface of the casing 5.

It will be apparent that vapors passing through the tuyere 9 will be more heavily laden with entrained liquid than the vapors passing through tuyere 12 and that vapors passing through the tuyere 12 which tangentially impinge upon the inner surface of casing 5 directly opposite the tuyere 12 will be more heavily laden with entrained liquid than the vapors ascending into the upper part of the casing. To prevent the upper strata of vapors from reabsorbing the liquid, means are therefore provided to divide the chamber within the casing into three zones. For this purpose, the outer periphery of plate 11 extends outwardly to a greater distance than baffle 14 forming a lower zone 19. Because of the upward movement of the vapors which flow over the liquid deposited on the inner surface of the casing, they have the tendency to force a small portion of the liquid deposited from the vapors upwardly. An annular flange or lip 20 is therefore provided to interrupt the flow of the liquid which lip defines the lower portion of the intermediate zone 21. There is also arranged above baffle plate 14 a rim 22 provided with an upwardly extending flange 23 providing a channel 24 which defines the lower boundary of the upper zone 25, the upper boundary of which is formed by the head 26 of the casing which is turned downwardly as indicated by the numeral 27 to define the outlet opening 7, and then extends outwardly and upwardly to provide a channel 28.

From the structure disclosed, it will be apparent that liquid deposited upon the inner surface of casing 5 opposite tuyere 9 will be moved by the centrifugal force of the vapors in a clockwise direction as indicated in Fig. 1 and will also flow downwardly by the force of gravity along the inner lower portion of the casing 5. Because the vapors are moving upwardly, it will also be apparent that a portion of the liquid will move upwardly under the influence of the rising vapors and will be deposited on the under side of the annular lip 20. The liquid deposited on the inner surface of the casing in zone 21 will have the tendency to creep downwardly by gravity and part of it will be deposited upon the upper surface of rim 20 and that portion of the liquid which is forced upwardly by the rising vapors will be deposited on the under side of rim 22 and in a like manner the liquid deposited upon the inner surface of casing 25 in zone 25 by the centrifugal or whirling movement of the vapors will flow downwardly into channel 24. Eddy currents of the vapors will also be formed in zone 25 and some of the liquid thrown from the vapors will be deposited in channel 28 of head portion 26. After the vapors flow out of casing 5, a drop in pressure will occur and some liquid will be deposited on the wall or head 26 which will be confined thereon by an outer rim 29 and an inner rim 29a surrounding the opening 7, both of which extend upwardly from the head 26 of the casing.

Means are also provided to drain the liquid separated from the vapors so that it will not be reabsorbed by the upwardly moving vapors. For this purpose, the wall 4 which is extended to form the lower portion of casing 5 is provided with an opening 30 and liquid descending downwardly along the inner surface of casing 5 in zone 19 is revolved by the centrifugal or whirling motion of the vapors to the opening 30 which leads into a sump 31. Sump 31 is provided with an outlet pipe 32, the lower portion of which enters into a bucket 33 to which it is secured by suitable means, such as welding.

To enable liquid to be drained from other portions of the casing, the casing is interrupted by a vertically extending opening 34, and a channel-shaped conduit means 35 is provided, one of the side walls of which is secured to casing 5 at a spaced distance from one edge of the opening and the other side wall of which is secured to the casing at a spaced distance from the opposite edge of the opening to provide vertically extending lips 36 and 37, and as the liquid on the opposite sides of lip 20, on the lower side of rim 22, and in the channel 24, is forced by the centrifugal or whirling movement of the vapors flowing around the inner periphery of the casing, the liquid flows into conduit means 35, the lips 36 and 37 being provided to prevent the reentrance of the liquid into the casing. As shown channel 28 is provided with conduit means, such as a pipe 38, which discharges liquid into channel 24 which liquid is also deposited in conduit means 35. The liquid from conduit means 35 also flows into sump 31 and is discharged through pipe 32 into bucket 33.

Rim 29 is also provided with an interruption 39 providing a narrow opening arranged substantially midway of the upper edge of the channel-shaped conduit means 35 and liquid deposited on head 26 of the casing flows through this opening along the outer face of the conduit means into a sump 40. Sump 40 is provided with an outlet pipe 41 which also extends into bucket 33 and may be welded or otherwise secured thereto. It will be noted that pipes 32 and 41 terminate above the bottom of bucket 33 and that the liquid in the bucket 33 provides a seal which prevents vapors from the liquid phase from flowing into the separator through pipe 32 and to the exit opening of the dome through pipe 41.

In the separator shown in Figs. 1 to 4, means are also provided to remove solid material which coalesces in the knitted mesh filter 16. For this purpose, a pipe 42 may be provided, the upper end of which is secured to baffle plate 14 by suitable means, such as welding. Pipe 42 is provided with a plurality of spaced apertures arranged opposite to the inner periphery 16 and has a connection 43 at its lower end to which a second pipe 44 is connected. Pipe 44 extends through the wall of the evaporator or still and is connected to the outlet end of a pump 45 arranged outside of the evaporator as illustrated diagrammatically in Fig. 3. The inlet end of pump 45 may be connected to any suitable source of liquid which is to be forced against the filter, either intermittently or continuously. It may, for instance be connected to the liquid in the evaporator. Preferably, however, it is connected to a source of liquid under pressure.

Instead of arranging the wire filter interiorly of the casing 5 as illustrated in Figs. 1 to 4, the wire filter may be supported below casing 5 in any desirable manner in which case it may be provided with considerable surface area so that the vapors will flow through the wire filter at a comparatively low velocity even when a high rate of evaporation is maintained, such as in stills or evaporators which are operated at reduced pressure.

As illustrated in the modification shown in Fig. 5, wire mesh is rolled into a cylindrical shape to form a cylindrical filter portion 46, the upper edge of which abuts the horizontal wall 4 and the lower edge of which engages an annular plate or ring 47 which is held in place by a plurality of spaced bolts 48 extending through plate 47 and connected to the horizontal wall 4 of the evaporator. In this modification additional wire filter pads 49 having converging side edges are provided which are arranged at an angle to the cylindrical roll 46 and may be supported in place by any suitable means. As illustrated, a dish-shaped plate 50 is provided having an inner opening which plate engages the inner face of a circular support 51 provided with a central boss 52 which extends upwardly through the opening in the plate. Support 51 is held in place by means of a rod 53 extending through the central opening 6 of casing 5, the upper end of which rod is secured to baffle plate 14. Plate 50 is provided with an annular flange 54 spaced inwardly from its outer periphery which provides a support for the lower ends of the wire filter pads, the upper ends of which are supported on a downwardly and inwardly inclined annular flange 55 formed integral with plate 47.

The cylindrical roll 46 is similar to roll 16 shown in Figs. 1 to 3 and may have a thickness of approximately 1 to 4 inches. The wire filter pads 49 may be built up to the desired thickness by multiple layers of fine wires arranged in close proximity to each other and which are preferably in the form of a knitted or woven mesh as illustrated diagrammatically in Fig. 4, each layer being crimped diagonally and laid with the crimps in each successive layer arranged at right angles to the preceding layer to control the percentage of free volume in the pad which may range from approximately 88% to 99%. The thickness of the pads may range from approximately 1 to 4 inches.

The remainder of the separator shown in Fig. 5 is substantially the same as the separator shown in Figs. 1 to 4 and the parts have accordingly been designated by the same reference numerals and in this connection, it may be stated that openings may be arranged in one of the inclined filter pads 49 to permit the passage of pipes 41 and 32 and in a like manner an opening may be provided in flange 55 to permit passage of pipe 41.

In the modification shown in Fig. 5, it will be noted that the wire mesh filter extends over a comparatively large area and consequently vapors rising from the liquid phase containing entrained liquid, and which may also contain some entrained solid material, pass at a comparatively low velocity through the wire mesh filter consisting of the cylindrical roll 46 and the inclined pads 49. Liquids entrained in the vapors impinging on the fine wires in the filters coalesce into the form of drops which either drain off or are picked up by the rising vapors and are carried between the vanes of tuyeres 9 and 12 and are deposited by the whirling vapors on the inner wall of casing 5 from which they may be drained in the same manner as previously described in connection with the modification shown in Figs. 1 to 4. Some of the solids coalesced in the wire filters will also be carried upwardly by the rising vapors and will be deposited with the liquid on the inner surface of casing 5 by the whirling vapors and some will be retained by the filter and may be removed at desired intervals, or if desired, suitable spraying means may be provided for this purpose, in which case the solids may be removed either continuously or intermittently.

In the modification shown in Fig. 5, it will be noted that the opening 6 in casing 5 is much smaller than the free volume of the wire filters and consequently vapors passing between the vanes of tuyeres 9 and 12 will be traveling at a much higher velocity than when passing through the wire filters. Entrained solids or vapors coalesced upon and carried through the wire filters by the rising vapors will therefore be thrown at a comparatively high speed against the inner periphery of the casing 5 and will be deposited thereon.

Figure 6:
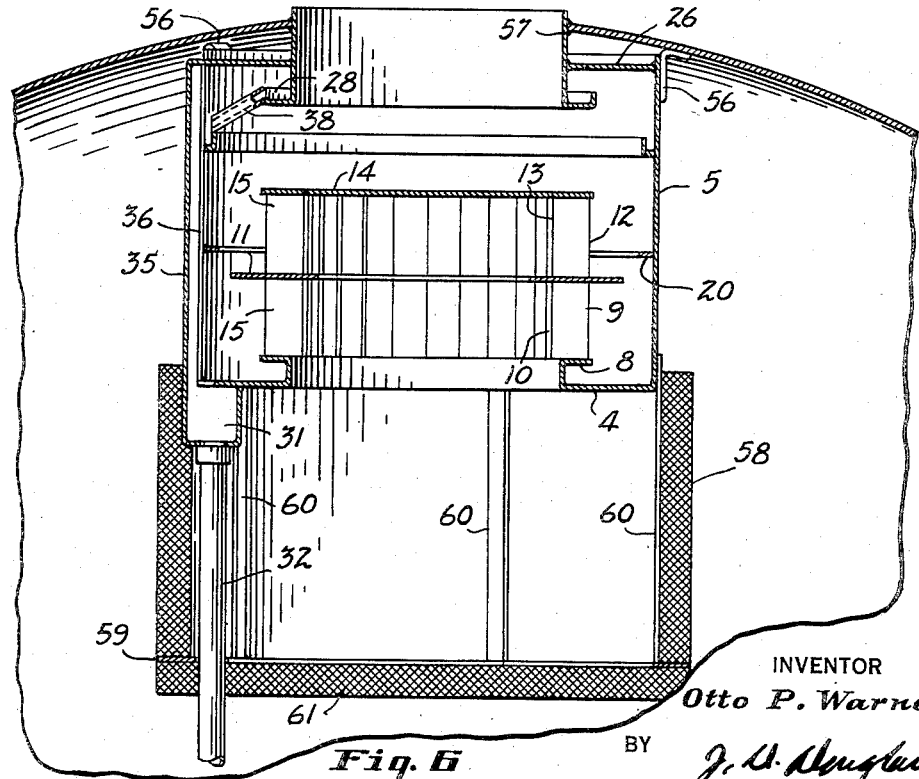
Fig. 6 is a cross sectional view showing another modification of the separator installed in the upper portion of an evaporator which is shown in cross section with parts broken away.

Another modification of the invention is shown in Fig. 6 in which the separator is secured to the upper wall of an evaporator or still 1 by means of brackets 56 and in which a flange 57 which defines the outlet opening of casing 5 of the separator is connected to the evaporator or still at the exit opening.

As illustrated in Fig. 6, fine wires arranged in close proximity to each other which are preferably in the form of a layer of knitted or woven wire mesh, is rolled into the desired shape to provide a cylindrical wire filter 58, the lower portion of which is supported by an annular ring 59. Ring 59, in turn, is supported by bars 60 which are secured thereto and to the lower end of casing 5 by suitable means, such as welding. The cylindrical wire filter may be secured to the bars 60 by any suitable means, such as tie wires, not shown. A circular wire pad 61 which is preferably formed of superimposed layers of woven or knitted wire mesh is also provided which may be secured to the plate 59 in any desirable manner. For instance, holes may be provided in plate 59 and the pad 61 may be secured to the plate 59 by suitable tie wires connected to pad 61 and secured to the plate 59, or if desired, the pad 61 may be secured to ring 59 by means of bolts extending through the pad 61 and ring 59. The cylindrical roll 58 is formed in the same manner as the cylindrical rolls 16 and 49 and the circular pad 61 is formed in the same manner as pads 49 previously described and each may have a thickness ranging from approximately 1 to 4 inches.

Fig. 6, the cylindrical roll is provided with an indentation to receive the conduit means 35 and the circular pad 61 is provided with an opening to receive the lower end of pipe 2 which leads into a suitable liquid seal to which it may be welded, such as a bucket as shown in Fig. 2. The separator disclosed in Fig. 6 operates in the same manner as that disclosed in Fig. 5, the vapors passing through the wire filters at a comparatively low velocity and liquids or solids which coalesce upon the wire filter and are carried by the rising vapors between the vanes of the tuyeres are thrown tangentially by the vanes at a comparatively high speed to deposit entrained liquids and solids on the interior surface of casing 5.

In the modification shown in Fig. 6, it will be noted that the flange 57 of the separator is connected to the exit opening of the evaporator or still and consequently liquid from the vapors passing through the outlet opening of the separator will not be deposited upon head 26. In this connection, it may be stated that a wire filter of the type shown in Figs. 1 to 3 may be inserted in the casing 5 of a separator of the type shown in Fig. 6 in the same manner as it is inserted in the casing 5 of a separator of the type shown in Figs. 1 to 3 in which case the opening in partition plate 11 shown in Fig. 6 will be of the same size as the inlet opening of the casing.

Instead of arranging the wire filter in a position to coalesce entrained liquids and solids from vapors before they pass into the casing 5, it may be arranged to coalesce entrained liquids and solids from vapors after the vapors pass through the opening 7 of the casing. It will be noted that after passing through casing 5, the velocity of the vapors decreases because of the increased area and consequently when a wire filter having a comparatively large surface area is arranged between the casing 5 and the outlet opening of the evaporator or still, the vapors will be flowing at a comparatively low velocity when they pass through the wire filter. The inlet opening to casing 5, however, is small compared to the area of the wire filter and consequently when a high rate of evaporation is provided in the evaporator or still, vapors passing through the casing will be flowing at a comparatively high velocity and will be centrifugally thrown or whirled against the inner surface of the casing at a comparatively high speed to remove a considerable portion of the solids and entrained liquids before the vapors pass through the wire filter. A separator of this type is therefore particularly adapted to be utilized in evaporators or stills in which a comparatively high rate of evaporation is maintained.

This form of the invention is illustrated in the modification shown in Fig. 7 in which a filter formed of fine wires arranged in close proximity to each other, such as in the form of a finely knitted or woven layer, is rolled into a cylindrical shape as indicated by the number 62 with a portion of its upper edge engaging the dome of the evaporator or still and its lower edge engaging the horizontal wall 4. This cylindrical wire mesh filter 62 which may have a thickness ranging from approximately 1 to 4 inches, may be supported in position by any suitable means. As illustrated, its upper end is held in place by an annular ring 63 engaging the upper wall of the dome and the wire filter which ring also serves as a vapor seal and its lower end is supported in place by an annular rim 64 secured to and extending upwardly from the horizontal wall 4 which rim may be provided with apertures to receive tie wires for anchoring the wire filter in place. It will be apparent that liquid entrained in the vapors passing through the cylindrical wire filter 62 will coalesce on the wire of the filter and will drain down the interior face of the filter into the sump 40 from which they are discharged through pipe 41 which is welded to the inner portion of a bucket 33 as illustrated in Fig. 2 of the drawings.

Instead of arranging the knitted or woven wire filter in concentric relation to the casing as shown in Fig. 7, the wire filter which may have a thickness of approximately 1 to 4 inches, may be inclined upwardly in the form of the outer layer of the frustum of a cone as illustrated by the numeral 65 in Fig. 8 of the drawings. As shown, the filter consists of a plurality of segments arranged in close fitting engagement with each other. The wire segments 65 may be formed in a manner similar to the segments 49 shown in Fig. 4 and are supported exteriorly of casing 5 in any suitable manner. As illustrated, the lower ends of the segments rest upon the wall or head 26 of casing 5 and are maintained thereon by the flange 29 which may be inclined outwardly to engage the lower edges of the segments 65 and the upper ends of the segments are supported by a plate 66 provided with a downwardly extending flange 67 which is held in place by a plurality of spaced metal bars or struts 68, each having its lower end secured by suitable means, such as welding, to head 26 of the casing and its upper end secured in a like manner to the flange 67 of plate 66.

In the structure disclosed in Fig. 8, the vapors flowing from casing 5 pass through the wire filter before passing to the exit opening of the evaporator or still and liquid entrained therewith coalesces in the form of droplets on the wire mesh and will flow downwardly along the interior surface of the filter to the head 26 from which they may be drained in the manner previously described, it being understood that liquid from the head 26 will flow through the filter 65 and that the flange 29 is provided with an opening to permit liquid to drain over the outside of the conduit means 35. When liquid coalesces in the form of drops on filter 65, some of the drops may fall into casing 5 in which event they will be removed from the casing in the manner previously described.

In the modification shown in Fig. 8, it will be noted that the surface area of the wire filter is greater than the inlet opening in casing 5 and consequently when the vapors pass through the wire filter, they will be flowing at a lower velocity than when passing through the casing 5. A separator of the type shown in Fig. 8 may therefore be utilized when a comparatively high rate of evaporation is maintained in the evaporator or still.

Another modification of the invention is shown in Fig. 9 in which the wire filter 69 is arranged below the entrance to casing 5 in any suitable manner. As illustrated, an annular ring 70 is arranged below the outer peripheral edge of the filter which may be secured to the bottom wall of casing 5 by suitable means, such as by a plurality of bolts 71 which extend through the ring and the bottom wall of casing 5. The pad 69 may be connected to the ring 70 by any suitable means, such as tie wires. The remainder of the separator shown in Fig. 9 is similar to that shown in Fig. 5 and the parts have accordingly been designated by the same reference numerals.

In the separator shown in Fig. 9, it will be apparent that entrained liquids and solids in vapors passing through the filter 69 will impinge upon and will be coalesced by the fine wire baffles in the filter. The liquids, and solids which are in solution or in suspension in the liquids, either drain off or are picked up by the rising vapors and are carried between the vanes of tuyeres 9 and 12 and deposited upon the interior wall of casing 5 in the manner previously described. Solids entrained in the vapors which are not in suspension or solution on the liquids will also be coalesced and a portion of such solids will be carried by the vapors to tuyeres 9 and 12 and deposited on the interior wall of casing 5 by the whirling or centrifugal motion imparted to the vapors by the vanes of the tuyeres, and the remainder will be retained in the wire filter and may be continuously or intermittently removed by suitable means. For instance, the filter may be removed at desired intervals for this purpose, or suitable spraying means, such as shown in Figs. 1 to 4, may be provided.

Instead of arranging the separator in an evaporator or still, it may be arranged in a line in which vapors having entrained liquids and solids therein may be passed under pressure to a suitable exit opening or to apparatus in which the vapors are to be utilized. This form of the invention is illustrated in Figs. 10 and 11 of the drawing in which suitable conduit means is provided including a pipe 72 which leads to the separator and a pipe 73 leading from the separator. Pipes 72 and 73 may be connected in the line in any suitable manner. As shown, pipe 72 is provided with a flange 74 which may be secured by suitable means, such as bolts, to the flange 75 of an inlet pipe 76 and a pipe 73 is provided with a flange 77 which may be connected in a similar manner to the flange 78 on an outlet pipe 79.

The separator illustrated in Figs. 10 and 11 is somewhat similar to that shown in Figs. 1 to 3 and includes a casing 80, the central portion of which is substantially cylindrical in shape and one end of which is inclined inwardly and is secured by suitable means, such as welding, to the pipe 72, and the other end of which is inclined inwardly and is secured by similar means to the pipe 73. The pipe 72 terminates within the casing and is provided with an outwardly extending annular flange 81 which may be welded or otherwise secured to the free end of pipe 72 and a pair of tuyeres 82 and 83 are provided, each of which consists of a plurality of vanes 84 which are inclined to a radial plane passing through the horizontal axis of the casing as shown in Fig. 11. One edge of each of the vanes in tuyere 82 may be secured by suitable means, such as welding, to flange 81 and the other edge is secured by similar means to a plate 85 provided with a cylindrical opening. In a like manner, one edge of each of the vanes in tuyere 83 is secured by welding to plate 85 and the opposite edge of each vane is secured by similar means to a baffle 86.

The inner edges of flange 81, plate 85 and vanes 84 provide a cylindrically-shaped opening and in accordance with the present invention, a cylindrical wire filter having a thickness of approximately 1 to 4 inches and which is formed of fine wires which are preferably woven or knitted in close proximity to each other to provide a plurality of baffles, is arranged in the opening and may be maintained in place by any suitable means. As shown, one end of filter 87 is arranged in abutting relation to baffle 86 and the opposite end is held in place by suitable means, such as a flange on a cylindrical angle member 87a, the other flange of which is welded or otherwise secured to the inlet pipe 72.

When vapors under pressure and containing entrained liquids and solids, a portion of which solids may be in solution or suspension in the entrained liquid, flow under pressure through the conduit means including pipes 76 and 72, casing 80, and pipes 73 and 79, the entrained liquids and solids will be coalesced by the wire filter and the drops or particles that are formed will be forced by the vapors between the vanes of tuyeres 82 and 83 and because the vanes of the tuyeres are inclined toward the axis of the casing, liquid and solid particles entrained with the vapors passing between the vanes will be thrown outwardly with a whirling or centrifugal motion against the inner periphery of casing 80 and the liquid will drain down the interior wall of the casing and will carry with it any solid particles which are present to a horizontally extending opening 88 formed in the lower portion of the casing through which it flows into a sump 89. Sump 89 is formed by a channel-shaped conduit means 90, one of the side walls of which is secured by suitable means, such as welding, to casing 80 adjacent to one side of the opening 88 and the other side wall of which is secured in a similar manner to the casing adjacent the opposite side of the opening. A portion of the solids which are not in suspension or solution in the liquid will also be coalesced and retained by the filter.

Because of the difference in pressure between the vapors flowing to the separator through inlet pipe 72 and outlet pipe 73, it is apparent that some of the liquid that is separated will be forced longitudinally along the inner periphery of the casing by the flow of the vapors. An annular rim or lip 91 which is welded or otherwise secured to the interior of the casing, is provided for intercepting the flow of such liquid which will drain downwardly around the interior of the rim and will flow through opening 88 into sump 89.

Because the vapors are travelling with a centrifugal or whirling motion while passing through casing 80, it is also apparent that some liquid will be deposited on the walls of the casing beyond the rim 91 in a zone designated by the numeral 92 and to prevent such liquid from being picked up by the vapors and carried into the outlet pipe 73, the outlet pipe 73 extends within the casing and is provided with a flange 93 and any liquid deposited on the inner surface of casing 80 or on the end of pipe 73 which extends into the casing will flow down the inclined end wall of the casing to sump 89 through opening 88. Sump 89 is provided with a suitable outlet opening to which a pipe 94 is secured and to prevent the escape of vapors, pipe 94 may extend into a suitable liquid seal, not shown.

In the modification shown in Figs. 10 and 11, it will also be apparent that if desired, a perforated pipe, such as shown in Figs. 1 to 4 may be provided through which liquid may be forced under pressure, either continually or intermittently to wash any solids which are retained by the filter. Because the wire filter has a comparatively large free volume, the washing liquid which is forced into engagement with the filter will flow through the filter and between the vanes of the tuyeres and will be thrown against the inner surface of the wall of the casing from which it flows through opening 88 into sump 89 and drain pipe 94.

What is claimed is:

1. In an apparatus having a wall provided with an exit opening and means for conducting vapors flowing by a differential in pressure through the apparatus to the exit opening, a separator arranged in said apparatus for removing entrained liquid and solids from vapors passing to the exit opening, said separator including a cylindrical casing having an inlet opening for receiving vapors flowing at a low velocity to the inlet opening of the casing and an outlet opening which communicates with the exit opening of said apparatus, means arranged within the casing for imparting a centrifugal motion to vapors passing through the casing to separate entrained liquids and solids therefrom and the outlet opening of said casing being of such size that vapors passing from the outlet opening of the casing to the exit opening of said apparatus will flow at a velocity which is not less than the velocity at which they flow through the inlet opening of the casing, and means including a wire mesh filter associated with said casing and arranged in the path of the vapors when they are flowing at a low velocity for coalescing entrained liquids and solids in said vapors without appreciably affecting the pressure of vapors flowing through the filter, said wire mesh filter having a free volume for the passage of vapors ranging from approximately 88% to 99% of the total free volume flow through the casing and the wires in said filter being arranged in such close relation to each other that they provide baffles on which liquids entrained with the vapors impinge and coalesce, the wire mesh filter including a cylindrical roll having the upper end secured to said casing and extending downwardly from the outer periphery of the casing and a circular wire mesh pad arranged over the lower inlet end of the cylindrical roll to close the opening therein, the combined surface areas of said roll and said pad being substantially greater than the area of the inlet opening of said casing, and means secured to the outer periphery of said casing for supporting the cylindrical roll and said pad in position to coalesce entrained liquids and solids from vapors flowing at a comparatively low velocity toward the inlet opening of the casing, at least a portion of which coalesced liquids and solids are carried by the vapors into the casing and are removed from the vapors within the casing by the centrifugal motion imparting means therein.

2. In an apparatus having a wall provided with an exit opening and means for conducting vapors flowing by a differential in pressure through the apparatus to the exit opening, a separator arranged in said apparatus for removing entrained liquid and solids from vapors passing to the exit opening, said separator including a cylindrical casing having an inlet opening for receiving vapors flowing at a low velocity to the inlet opening of the casing and an outlet opening which communicates with the exit opening of said apparatus, means arranged within the casing for imparting a centrifugal motion to vapors passing through the casing to separate entrained liquids and solids therefrom and the outlet opening of said casing being of such size that vapors passing from the outlet opening of the casing to the exit opening of said apparatus will flow at a velocity which is not less than the velocity at which they flow through the inlet opening of the casing, and means including a wire mesh filter associated with said casing and arranged in the path of the vapors ahead of the inlet opening of the casing for coalescing entrained liquids and solids in said vapors without appreciably affecting the pressure of vapors flowing through the filter, said wire mesh filter having an open area across its surface exposed to the flowing vapors which is substantially greater than the area of said inlet opening of the casing, said wire mesh filter having a free volume for the passage of vapors within the range from 88% to 99% of the total free volume flow through the casing and the wires in said filter being arranged in such close relation to each other that they provide baffles on which liquid entrained with the vapors impinges and coalesces, said wire mesh filter comprising a cylindrical roll of wire mesh, said cylindrical roll of wire mesh at one end being attached to the casing and at its other end defining an opening larger than the inlet opening of the casing and which is arranged in concentric relation to the inlet opening of the casing, and additional wire mesh filter means at said opening defined by said cylindrical roll which supplements the cylindrical roll in coalescing entrained liquids and solids flowing toward the inlet opening of the casing, and at least a portion of the coalesced liquids and solids in said filter being carried by said vapors to the centrifugal motion imparting means arranged within the casing.

References Cited in the file of this patent

UNITED STATES PATENTS

| | | |
|---|---|---|
| 1,099,773 | Smith | June 9, 1914 |
| 1,405,259 | Beach | Jan. 31, 1922 |
| 1,505,744 | Stebbins | Aug. 19, 1924 |
| 1,915,987 | Fisher et al. | June 27, 1933 |
| 2,117,718 | Hawley | May 17, 1938 |
| 2,144,681 | Krassl | Jan. 24, 1939 |
| 2,399,842 | Warner | May 7, 1946 |
| 2,511,967 | Campbell | June 20, 1950 |
| 2,514,623 | Brown | July 11, 1950 |
| 2,521,785 | Goodloe | Sept. 12, 1950 |
| 2,527,392 | Bradshaw | Oct. 24, 1950 |
| 2,547,769 | Packie et al. | Apr. 3, 1951 |
| 2,594,490 | Patterson | Apr. 29, 1952 |
| 2,745,513 | Massey | May 15, 1956 |

FOREIGN PATENTS

| | | |
|---|---|---|
| 168,129 | Switzerland | June 1, 1934 |